US012615523B2

(12) United States Patent
Zhou et al.

(10) Patent No.: US 12,615,523 B2
(45) Date of Patent: Apr. 28, 2026

(54) AP LIVE UPGRADING MECHANISM IN WIFI-7

(71) Applicant: HEWLETT PACKARD ENTERPRISE DEVELOPMENT LP, Spring, TX (US)

(72) Inventors: Qiang Zhou, Santa Clara, CA (US); Berend Dunsbergen, Santa Clara, CA (US); Xuguang Jia, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 513 days.

(21) Appl. No.: 18/308,407

(22) Filed: Apr. 27, 2023

(65) Prior Publication Data

US 2024/0365134 A1      Oct. 31, 2024

(51) Int. Cl.
H04W 24/02       (2009.01)
G06F 8/65       (2018.01)

(52) U.S. Cl.
CPC ............. H04W 24/02 (2013.01); G06F 8/65 (2013.01)

(58) Field of Classification Search
CPC ............. H04W 24/02; H04W 8/30; G06F 8/65
See application file for complete search history.

(56) References Cited

U.S. PATENT DOCUMENTS

| | | | | |
|---|---|---|---|---|
| 2008/0320243 | A1* | 12/2008 | Mitsuzuka | ............ G06F 15/167 711/E12.016 |
| 2015/0098392 | A1* | 4/2015 | Homchaudhuri | ..... H04W 48/20 370/329 |
| 2018/0255582 | A1* | 9/2018 | Kecicioglu | .......... H04B 17/318 |
| 2019/0097948 | A1* | 3/2019 | Browne | .............. H04L 49/3063 |

(Continued)

FOREIGN PATENT DOCUMENTS

| | | | | |
|---|---|---|---|---|
| CN | 120153753 A | * | 6/2025 | ............. H04L 1/189 |
| EP | 2103006 B1 | * | 3/2018 | ............ H04W 72/23 |

(Continued)

OTHER PUBLICATIONS

RFC 8350 Alternate Tunnel Encapsulation for Data Frames in Control and Provisioning of Wireless Access Points (CAPWAP), 2018; hereinafter RFC8350 (Year: 2018).*
Wi-Fi 7: The next generation in the evolution of Wi-Fi Monica Paolini, Senza Fili, 2020 (Year: 2020).*
IEEE 802.11be: Wi-Fi 7 Strikes Back Adrian Garcia-Rodriguez, David Lopez-P ' 'erez, Lorenzo Galati-Giordano, and Giovanni Geraci, 2020 (Year: 2020).*
Wi-Fi Unleashed: Wi-Fi 7, 6 GHz, and Beyond Carlos Cordeiro, PhD Intel Fellow and Wireless CTO (Client Computing Group) Intel Corporation Jun. 2022 (Year: 2022).*

(Continued)

*Primary Examiner* — Michael A Keller
(74) *Attorney, Agent, or Firm* — Sheppard Mullin Richter & Hampton LLP

(57)       ABSTRACT

Systems and methods are provided for performing live upgrading of Access Points (APs) in WiFi-7. A method of upgrading an AP having Multi-Link Operation (MLO) and a Multi-Link Device (MLD) comprising a UMAC sublayer (MLD UMAC) and an LMAC sublayer (MLD LMAC), includes determining whether the MLD is in tunnel mode, and when the MLD is not in tunnel mode, switching the MLD to tunnel mode. Contents of the MLD UMAC are transferred to a controller; and contents of the MLD LMAC, comprising one or more MLD links, are transferred to one or more neighbor APs. Live upgrade of the upgrading AP is performed, after which the upgrading AP is rebooted. The MLD links previously transferred to the one or more neighbor APs are transferred back to the upgraded AP, and the contents of the MLD UMAC are copied from the controller to the UMAC of the upgraded AP.

20 Claims, 9 Drawing Sheets

(56) References Cited

U.S. PATENT DOCUMENTS

| | | | |
|---|---|---|---|
| 2020/0120070 A1* | 4/2020 | Thubert | H04L 47/826 |
| 2021/0136050 A1* | 5/2021 | Leventer | H04M 7/1215 |
| 2021/0212150 A1 | 7/2021 | Chu et al. | |
| 2021/0274378 A1 | 9/2021 | Chen et al. | |
| 2021/0274574 A1 | 9/2021 | Ghosh et al. | |
| 2021/0314846 A1 | 10/2021 | Chu et al. | |
| 2021/0321243 A1 | 10/2021 | Patil et al. | |
| 2021/0337613 A1 | 10/2021 | Seok et al. | |
| 2021/0368419 A1 | 11/2021 | Kwon et al. | |
| 2021/0392571 A1 | 12/2021 | Kneckt et al. | |
| 2022/0022033 A1 | 1/2022 | Ho et al. | |
| 2022/0060927 A1* | 2/2022 | Kota | H04W 28/0268 |
| 2022/0132611 A1* | 4/2022 | Fang | H04W 76/20 |
| 2022/0225200 A1* | 7/2022 | Smith | H04W 76/15 |
| 2022/0303356 A1* | 9/2022 | Cariou | H04L 5/001 |
| 2023/0422057 A1* | 12/2023 | Ratnam | H04L 1/0025 |
| 2024/0039786 A1* | 2/2024 | Ramanathan | H04L 41/16 |
| 2024/0276334 A1* | 8/2024 | Nayak | H04W 36/28 |
| 2024/0298213 A1* | 9/2024 | Hart | H04W 76/15 |
| 2024/0306013 A1* | 9/2024 | Schelstraete | H04W 24/02 |

FOREIGN PATENT DOCUMENTS

| | | | | | |
|---|---|---|---|---|---|
| EP | 4531462 A1 | * | 4/2025 | | H04W 84/12 |
| JP | 2013042461 A | * | 2/2013 | | |
| JP | 2019047236 A | * | 3/2019 | | |
| JP | 2020088630 A | * | 6/2020 | | |
| JP | 2023125084 A | * | 9/2023 | | |
| JP | 2024061709 A | * | 5/2024 | | |
| JP | 2024117659 A | * | 8/2024 | | |
| JP | 2024135419 A | * | 10/2024 | | |
| KR | 20200015508 A | * | 2/2020 | | H04W 4/46 |
| WO | 2021/262092 A1 | | 12/2021 | | |
| WO | WO-2024055335 A1 | * | 3/2024 | | H04L 1/189 |
| WO | WO-2025037835 A1 | * | 2/2025 | | H04W 84/12 |

OTHER PUBLICATIONS

International Journal of Trend in Scientific Research and Development (IJTSRD), Wireless Standards: Wi-Fi 6 Evolution and Wi-Fi 7 Prashrita Kaushal, 2021 (Year: 2021).*
IEEE Xplore Next Generation Wi-Fi and 5G NR-U in the 6 GHz Bands: Opportunities & Challenges Gaurang Naik, 2020 (Year: 2020).*
IEEE 802.11be—Wi-Fi 7: New Challenges and Opportunities Cailian Deng, 2020 (Year: 2020).*
Cisco Determine What Impacts GRE Tunnel Interface States, 2023 (Year: 2023).*
Cisco Nexus 9000 Series NX-OS Interfaces Configuration Guide, Release 7.x, 2021 (Year: 2021).*
Configure a Multi-SA Virtual Tunnel Interface on a Cisco IOS XE Router, 2022 (Year: 2022).*
Configure a Multi-SA Virtual Tunnel Interface on a Cisco IOS XE Router, 2022 x. Wireless Access Controller (AC and Fit AP) V200R019C00 CLI-based Configuration Guide, 2021 (Year: 2021).*
Multi-link Operation in IEEE 802.11be WLANs, 2022 (Year: 2022).*
Cisco Wireless Controller Configuration Guide, Release 8.10, 2022 (Year: 2022).*
Performance of 802.11be Wi-Fi 7 with Multi-Link Operation on AR Applications Molham Alsakati, 2023 (Year: 2023).*
Wi-Fi 7 Scenarios and Technologies Zhang Zhigang, 2022 (Year: 2022).*
Cisco Catalyst 9800 Series Wireless Controller Software Configuration Guide, Cisco IOS XE 17.9.x, 2023 (Year: 2023).*
RFC 5416, Control and Provisioning of Wireless Access Points (CAPWAP) Protocol Binding for IEEE 802.11, 2009 (Year: 2009).*

* cited by examiner

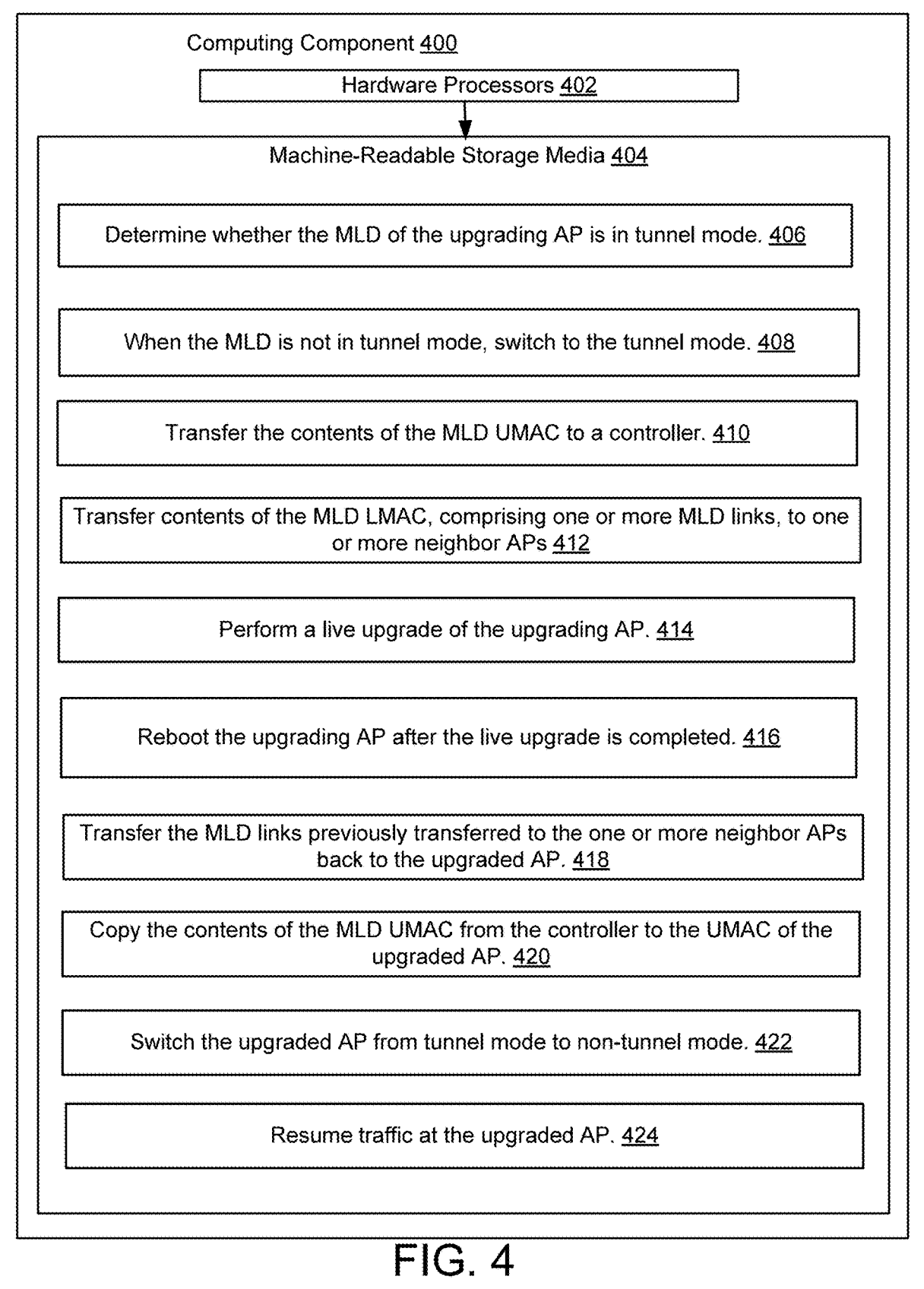

Computing Component 400

Hardware Processors 402

Machine-Readable Storage Media 404

Determine whether the MLD of the upgrading AP is in tunnel mode. 406

When the MLD is not in tunnel mode, switch to the tunnel mode. 408

Transfer the contents of the MLD UMAC to a controller. 410

Transfer contents of the MLD LMAC, comprising one or more MLD links, to one or more neighbor APs 412

Perform a live upgrade of the upgrading AP. 414

Reboot the upgrading AP after the live upgrade is completed. 416

Transfer the MLD links previously transferred to the one or more neighbor APs back to the upgraded AP. 418

Copy the contents of the MLD UMAC from the controller to the UMAC of the upgraded AP. 420

Switch the upgraded AP from tunnel mode to non-tunnel mode. 422

Resume traffic at the upgraded AP. 424

FIG. 4

Example of AP during upgrade. MLD UMAC Sublayer of AP1 moved to Controller

AP LIVE UPGRADING MECHANISM IN WIFI-7

BACKGROUND

The seven-layer Open Systems Interconnection (OSI) model of computer networking includes the physical layer, the data link layer, the network layer, the transport layer, the session layer, the presentation layer, and the application layer. The physical layer is the first and lowest layer, and is the layer most closely associated with the physical connection between devices. The physical layer provides an electrical, mechanical, and procedural interface to the transmission medium. The shapes and properties of the electrical connectors, the frequencies to broadcast on, the line code to use, and similar low-level parameters are specified by the physical layer.

The data link layer is the second layer and is the protocol layer that transfers data between nodes on a network segment across the physical layer. The data link layer provides the functional and procedural means to transfer data between network entities and may also provide the means to detect and possibly correct errors that can occur in the physical layer. The data link layer is concerned with local delivery of frames between nodes on the same level of the network.

The Medium Access Control (MAC) sublayer is the layer that controls the hardware responsible for interaction with the wired, optical, or wireless transmission medium. The MAC sublayer and the Logical Link Control (LLC) sublayer together make up the data link layer. The LLC provides flow control and multiplexing for the logical link, while the MAC provides flow control and multiplexing for the transmission medium. When sending data to another device on the network, the MAC sublayer encapsulates higher-level frames into frames appropriate for the transmission medium (i.e. the MAC adds a sync word preamble and also padding if necessary), adds a frame check sequence to identify transmission errors, and then forwards the data to the physical layer as soon as the appropriate channel access method permits. When receiving data from the physical layer, the MAC block ensures data integrity by verifying the sender's frame check sequences, and strips off the sender's preamble and padding before passing the data up to the higher layers. Accordingly, the MAC layer can request services from the physical layer in a single network device.

The Institute of Electrical and Electronics Engineers (IEEE) 802.11 communication standards—more commonly referred to as Wi-Fi—specify a set of Medium Access Control (MAC) and physical layer (PHY) protocols for implementing wireless local area network (WLAN) computer communication. The IEEE 802.11 protocol denotes a set of interface standards developed by the IEEE 802.11 committee for short-range communications. For example, the devices that implement the IEEE 802.11 protocol may have both 2.4 GHz and 5 GHz radios for transmitting and receiving data and management frames between devices with similar radio configurations.

IEEE 802.11v is the Wireless Network Management standard for the IEEE 802.11 family of standards. The IEEE 802.11 interface standards govern wireless networking transmission methods. They are commonly used today in their 802.11a, 802.11b, 802.11g, 802.11n, and 802.11ac versions to provide wireless connectivity in the home, office, and some commercial establishments. IEEE 802.11v is an amendment to the IEEE 802.11 standard to allow configuration of client devices while connected to wireless networks. More particularly, IEEE 802.11v allows client devices to exchange information about the network topology, including information about the RF environment, making each client network aware, thereby facilitating overall improvement of the wireless network. IEEE 802.3 is a working group and a collection standards defining the physical layer and data link layer's MAC of wired Ethernet. This is generally a local area network (LAN) technology with some wide area network (WAN) applications.

Wi-Fi 7 is the successor to Wi-Fi 6/6E and promises to significantly boost the speed and stability of wireless connections while offering lower latency and the ability to seamlessly manage more connections than prior. One challenge with Wi-Fi 7 has been performing live software upgrading of Access Points (APs). Typical methods of performing live upgrading have drawbacks that can cause connection issues.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 is an example computing component that may be used to implement various features of examples described in the present disclosure.

Figure 1:
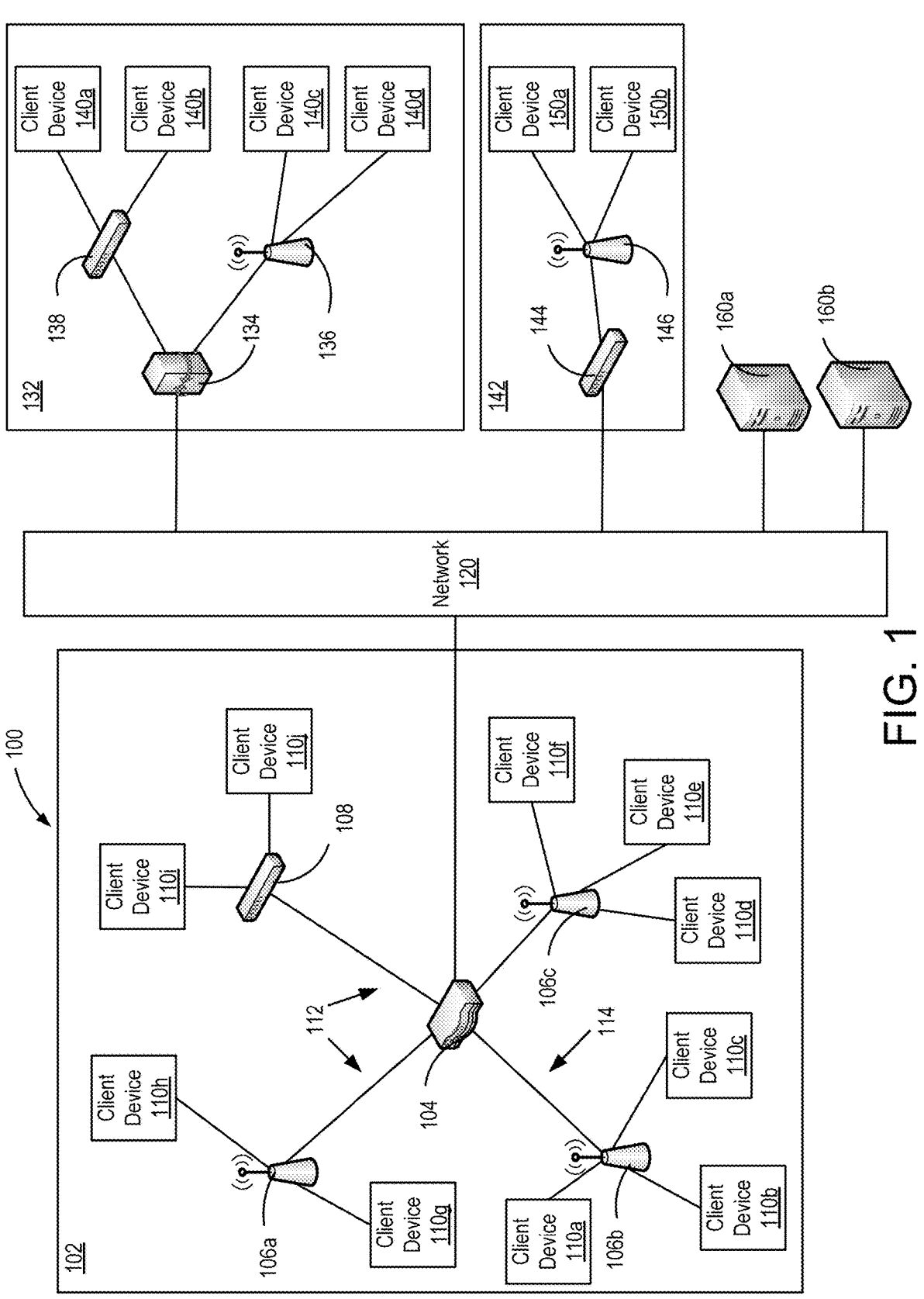
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Examples of the present disclosure provide systems and methods for performing live upgrading of Access Points (APs) in WiFi-7. The disclosed technology in examples provides mechanisms for performing live software upgrading of APs in which connection issues are eliminated or reduced.

Conventional solutions for live upgrading of Access Points (APs) are mainly based on client match. An AP that is selected for software upgrading, which necessitates a reboot, typically recommends its associated clients to candidate roaming neighbor APs during the upgrade, if the respective client supports specific protocols such as 802.11v.

However, if the client does not support such protocols, or the client is not willing to disconnect from the AP to navigate to a neighbor AP, the only thing the AP can do is send a deauthentication frame (deauth frame) to force a disconnection from the client. This can sometimes cause subsequent connection issues.

MLO (Multi-Link Operation) is a significant MAC feature introduced in Wi-Fi 7. MLO enables devices to simultaneously send and receive data across different frequency bands and channels, such as a 2.4 GHz band, a 5 GHz band, and a 6 GHZ band. More specifically, MLO is a particular feature of the IEEE 802.11be Extremely High Throughput (EHT) Wi-Fi 7 standard that allows network devices, like APs and client devices, the ability to transmit and receive data from the same traffic flow over multiple radio channels. For example, a first network device (e.g., the AP) may implement multiple radios, like a 2.4 GHz radio and 5 GHz radio, and each of these radios may communicate with a similar or overlapping frequency radios on a second network device (e.g., the client device). Accordingly, multi-link devices (MLDs) may communicate with one another using multiple links (e.g., 2.4 GHz, 5 GHz, 6 GHz). Having multiple links to choose from increases throughput. Secure MLD operation (e.g., APs or other MLDs) involves encrypting frames of a message. Each frame may include a header, a preamble, and error checking information. The preamble may include a code indicating the start of a frame.

MLO also allows a non-Access Point Multi-Link Device (non-AP MLD) to send data to or receive data from a MLD over multiple links. As such, all links of a multi-link entity that reside in a single hardware device can be used for MLO transmissions. For example, a first set of frames (e.g., data frames) may be transmitted from a first network device to a second network device on a first radio channel, and a second set of frames (e.g., control frames) may be transmitted from the first network device to the second network device on a second radio channel.

Accordingly, MLO enables a non-AP MLD to discover, authenticate, associate, and set up multiple links with an AP MLD. After the MLD setup procedure, each link enables channel access and frame exchanges between the non-AP MLD and the AP MLD. The MLD architecture includes an MLD Upper MAC sublayer (MLD UMAC) and an MLD Lower MAC sublayer (MLD LMAC). UMAC and LMAC deal with different Wi-Fi packets routines. BSSID (Basic Service Set Identifier) is the MAC physical address of the access point or wireless router that is used to connect to the WiFi.

Conventionally, MAC/BSSID addresses are assigned to a physical AP; that is, both UMAC and LMAC are assigned and bound to a physical AP.

In contrast, in examples of the present disclosure, MAC/BSSID addresses are assigned to MLO and its links, and during the upgrading only LMAC is left in a physical AP (in some examples being temporarily moved to a neighbor AP), so that clients have the flexibility to roam from one AP to another seamlessly. During the upgrading UMAC is moved to an external location, i.e., a location external to the upgrading AP, for example to a controller, a central cloud platform, a virtual controller (which may be another AP), a gateway, or others.

More specifically, in examples of the present disclosure, when an AP is selected to be upgraded, the UMAC contents of the MLD are synced and copied to a location external to the upgrading AP. In this disclosure, a location external to an upgrading AP (or an external location) refers to a controller, a central cloud platform, a virtual controller, or others. A tunnel is created between the external location and an AP, and all AP frames 802.11 are transmitted to the external location, and the external location translates/converts from 802.11 to 802.3. In one example, MLD UMAC exchanges 802.11 format wireless packets with MLD LMAC, since MLD UMAC has been copied over to the external location and 802.11 format packets cannot be forwarded through a native ethernet network. A tunnel between the AP with the MLD LMAC and the external location with the MLD UMAC is created to transmit 802.11 frames between the MLD UMAC entity and the MLD LMAC entity. In the external location with the MLD UMAC, 802.11 frames from the AP with the MLD LMAC are converted to 802.3 format frames and then sent to the ethernet. 802.3 frames from the ethernet are converted to 802.11 frames and sent to the AP with the MLD LMAC. Then, the LMAC contents of one or more MLD links are synced and copied to a single selected neighbor AP or different neighbor APs. After moving all necessary MLD links to neighbor APs, the AP selected for upgrading can perform a live upgrade and reboot. After rebooting, all MLD links previously moved to neighbor APs will be moved back through the same procedures. A re-key may be needed to resume the traffic.

Essentially, some examples of the disclosed technology shift the MLD of the upgrading AP to tunnel mode if the MLD is not already in tunnel mode, and then during the upgrading the contents of the UMAC are moved to the external location while the contents of the LMAC are moved to a physical AP such as a neighbor AP, so that the contents of the LMAC can stay in a physical AP.

Technical improvements are realized throughout the disclosure. For example, by virtue of the features of the present disclosure, the above-noted problem with existing live upgrading can be solved. The solution in examples does not request any changes at the client side, and a client with MLO capability is unaware of any changes with the network during the AP upgrading.

The present disclosure according to one example provides a method of upgrading an Access Point (AP) having Multi-Link Operation (MLO), the upgrading AP having a Multi-Link Device (MLD) comprising a UMAC sublayer (MLD UMAC) and an LMAC sublayer (MLD LMAC). The method includes determining whether the MLD is in a tunnel mode, and when the MLD is not in the tunnel mode, switching the MLD to the tunnel mode. The method also includes transferring contents of the MLD UMAC to a location external to the upgrading AP; and transferring contents of the MLD LMAC, comprising one or more MLD links, to one or more neighbor APs. A live upgrade of the upgrading AP is performed, and the upgrading AP is rebooted after the live upgrade is completed. The method further includes transferring the MLD links previously transferred to the one or more neighbor APs back to the upgraded AP, and copying the contents of the MLD UMAC from the external location to the UMAC of the upgraded AP.

After the copying step, the upgraded AP may be switched from the tunnel mode to a non-tunnel mode, and traffic may be resumed at the upgraded AP.

The step of switching the MLD to the tunnel mode may include creating a tunnel between the external location and the upgrading AP.

In some examples the location external to the upgrading AP (also referred to as the external location) may be a controller, a central cloud platform, a virtual controller, another AP, a gateway, or others.

In some examples the step of transferring contents of the MLD UMAC to an external location comprises (a) syncing and copying all contents of the MLD UMAC from the upgrading AP to the external location, (b) running, at the external location, the MLD UMAC temporally for the upgrading AP, (c) reconnecting the MLD LMAC of the upgrading AP to the temporal MLD UMAC of the external location, and (d) resuming traffic at the upgraded AP using the temporal MLD UMAC of the external location. Resuming the traffic may comprise implementing a re-key.

In some examples, the transferring contents of the MLD LMAC, comprising one or more MLD links, to one or more neighbor APs comprises (a) syncing and copying all contents of the MLD LMAC to the one or more neighbor APs to create an emulated MLD LMAC at the one or more neighbor APs, (b) connecting, by the one or more neighbor APs, the emulated MLD LMAC to the MLD UMAC of the external location, (c) resuming traffic at the external location and the one or more neighbor APs, and (d) deleting the MLD LMAC from the upgrading AP. In examples only one MLD link is transferred at a time.

When a number of neighbor APs in a same channel as the upgrading AP is below a predefined number, the external location may change the channel of the upgrading AP to a new channel and search for more candidate neighbor APs in the new channel. Or, the channel of a candidate neighbor AP in a new channel may be changed to the same channel as the upgrading AP.

The step of performing a live upgrade of the upgrading AP may be initiated when at least one MLD link of the contents of the MLD LMAC has been transferred to the one or more neighbor APs.

The step of transferring the MLD links previously transferred to the one or more neighbor APs back to the upgraded AP may comprise (a) syncing and copying all contents of the MLD LMAC, transferred from the upgrading AP to the one or more neighbor APs, back to the upgraded AP, (b) connecting, at the upgraded AP, the contents of the MLD LMAC transferred back from the one or more neighbor APs to the MLD UMAC of the external location, (c) deleting, at the one or more neighbor APs, the contents of the MLD LMAC transferred from the upgrading AP, and (d) resuming traffic at the upgraded AP using the MLD UMAC of the external location. In examples only one MLD LMAC link is transferred at a time.

The step of copying the contents of the MLD UMAC from the external location to the UMAC of the upgraded AP may comprise (a) syncing and copying all contents of the MLD UMAC from the external location to the upgraded AP, (b) running, at the upgraded AP, the MLD UMAC, (c) reconnecting the MLD LMAC, and (d) resuming traffic at the upgraded AP. Resuming the traffic at the upgraded AP may further comprise implementing a re-key.

As noted above, during the upgrading, UMAC is moved to an external location (i.e., a location external to the upgrading AP), wherein the external location may be a controller, a central cloud platform, a virtual controller (which may be another AP), a gateway, or others. In the examples to follow, the external location is a controller; however, it is of course to be understood that the present disclosure is not limited to the external location being a controller, and other external locations such as those described herein may be used.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. FIG. 1 illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which may be an office network, home network, or other network installation, for example. The primary network may be a private network, such as a network that may include security and access controls to restrict access to authorized users of the private network. Authorized users may include employees of a company at primary site 102, residents of a house, customers at a business, for example.

In the example of FIG. 1, the primary site 102 includes a controller 104, which is in communication with the network 120. The controller 104 may provide communication with the network 120 for the primary site 102. There may be other points of communication with the network 120 for the primary site 102 in addition to controller 104. Although single controller 104 is illustrated, the primary site 102 may include multiple controllers and/or multiple communication points with network 120, any combination of which may be MLDs. In some embodiments, the controller 104 may communicate with the network 120 through a router, which may also be an MLD capable of multi-link tunnel communications that are compliant with the IEEE 802.11 standard. In other embodiments, the controller 104 provides router functionality to the devices in the primary site 102. In this specification, the word "tunnel" refers to an encapsulated mode of transporting data between AP and controller. As noted herein, in some AP platforms, two forwarding modes are supported: tunnel mode (e.g., raw tunnel mode or d-tunnel mode) and non-tunnel mode (e.g., bridge mode). MLO operates in a different way for these two modes. For tunnel mode, the MLD UMAC sublayer is resident in a controller (such as controller 104 of FIG. 1) and the MLD LMAC sublayer runs in an AP (such as APs 106a-c of FIG. 1). For non-tunnel mode, both the MLD UMAC sublayer and the MLD LMAC sublayer run in an AP.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an Access Point (AP). The controller 104 may be or include an MLD, which may be capable of multi-link tunnel communications compliant with the IEEE 802.11 standard.

The controller 104 may be in communication with one or more switches 108 and/or wireless Access Points (APs) 106a-c. Wireless APs 106a-c and switches 108 may also be an MLD that is capable of multi-link tunnel communications are compliant with the IEEE 802.11 standard. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IOT) devices, and the like.

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network configuration 100. The client devices 110*i-j* may also be able to access the network 120, through the switch 108. The client devices 110*i-j* may communicate with the switch 108 over a wired or wireless 112 connection. In the illustrated example, the switch 108 communicates with the controller 104 over a wired or wireless 112 connection.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the example of FIG. 1, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be a satellite office, another floor or suite in a building, for example. The remote site 132 may include a gateway device 134 for communicating with the network 120. A gateway device 134 may be a router, a digital-to-analog modem, a cable modem, a digital subscriber line (DSL) modem, or some other network device configured to communicate with the network 120. The remote site 132 may also include a switch 138 and/or AP 136 in communication with the gateway device 134 over either wired or wireless connections. The switch 138 and AP 136 provide connectivity to the network for various client devices 140*a-d*. Gateway device 134, AP 136, and switch 138, may be MLDs that are capable of multi-link tunnel communications compliant with the IEEE 802.11 standard.

In various embodiments, the remote site 132 may be in direct communication with primary site 102, such that client devices 140*a-d* at the remote site 132 access the network resources at the primary site 102 as if these client devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. The gateway device 144 and the wireless AP 146 may be MLDs that are cable of multi-link tunnel communications compliant with the IEEE 802.11 standard. Such a remote site 142 may represent, for example, an individual employee's home or a temporary remote office. The remote site 142 may also be in communication with the primary site 102, such that the client devices 150*a-b* at the remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. The content servers 160*a-b* may include various providers of multimedia downloadable and/or streaming content, including audio, video, graphical, and/or text content, or any combination thereof. Examples of content servers 160*a-b* include web servers, streaming radio and video providers, and cable and satellite television providers. The client devices 110*a j*, 140*a-d*, 150*a-b* may request and access the multimedia content provided by the content servers 160*a-b*. The content servers 160*a-b* may be MLDs that are cable of multi-link tunnel communications compliant with the IEEE 802.11 standard. The portions of network 120 and/or the individual sites 102, 132, 142, may utilize dynamic frequency selection (DFS) channels for communication. As an example, communication over a secure tunnel may exist between controller 104 and AP 106*a-c*. Having multi-link communications increase the throughput.

Figure 2:
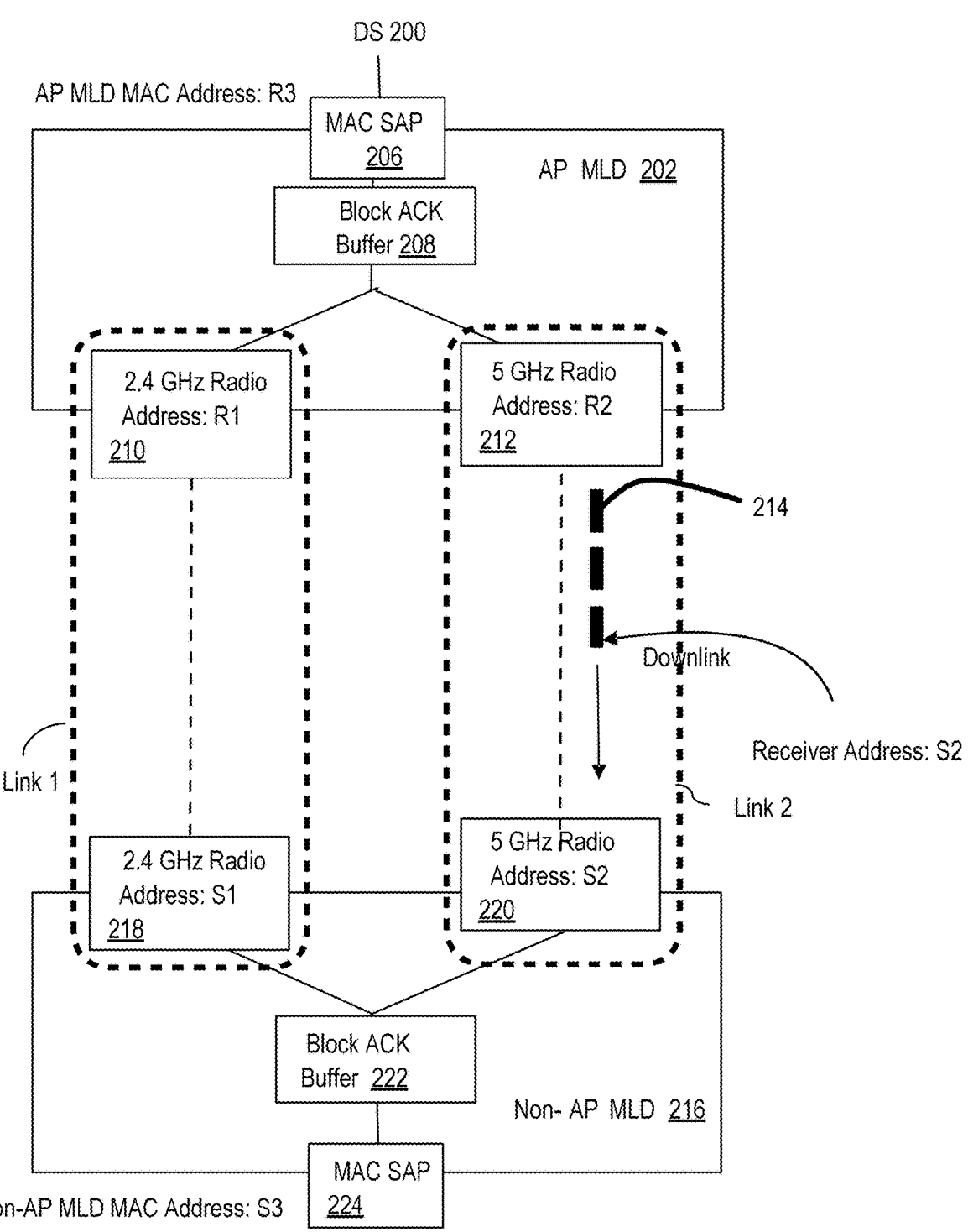
FIG. 2 illustrates an example multi-link device (MLD) communication.

FIG. 2 illustrates an MLD communication 200. In FIG. 2 a message comes from a distribution system (DS) 200, such as a network, to an access point, AP MLD 202. In FIG. 2, a message from DS arrives at AP MLD 202, via media access control layer-service access point (MAC-SAP) 206 and waits in a queue in block ack (BA) buffer 208 to be sent to Non-AP MLD 216. The message is sent via either Link 1 or Link 2. During multi-link operations (MLO), multiple 802.11 devices with multiple radios may operate simultaneously on multiple channels, which may carry multiple frequencies (e.g., 2.4 GHz, 5 GHz, 6 GHz or other frequencies). Frames from a single traffic session can be sent on multiple links using the first available link (Link 1 or Link 2). Each link may be a unique wireless channel (as defined in the 802.11 standard). If the message is sent via Link 1, the message is sent from address R1 across interface 210 to address S1 across interface 218. If the message (e.g., frame 214) is sent via Link 2, the message travels from address R2 across interface 212 to address S2 across interface 220. Whether the message arrives via interface 218 or 220, the message waits in a queue at BA buffer 222, to be sent to DS, via MAC SAP 224. MLO allows a non-AP MLD 216 to send/receive data to/from AP MLD 202 over multiple links (Link 1 and Link 2). In the example of FIG. 2, a non-AP MLD 216 is associated with AP MLD 202 that is sending frames on the downlink (DL) on 'Link 2' in the 5 GHz frequency range.

The MAC SAP component 224, or Media Access Control (MAC) Service Access Point (SAP), may provide an interface for connecting the radios of network devices to a backend system. This interface functionality may include access to control and management functions as a physical or virtual controller of a network device and provide corresponding functionality. For example, the MAC SAP serves as a translator with the network devices and the lower layers of IEEE 802.11 (Wi-Fi) and IEEE 802.3 (Ethernet). MAC SAP component 224 may enable the functionality of an access point to give the network devices access to the wired network.

Sending data from a traffic session using the first available channel (selected from multiple channels) can improve throughput and reduce latency. The MLDs, AP MLD 202 and non-AP MLD 216, may be logical entities defined by the IEEE 802 family of standards to interface multiple MAC/physical layer (MAC/PHY) systems with each other. AP MLD 202 and non-AP MLD 216 may each have a single MAC-SAP (206 and 224) interface to the upper layers, so that the upper layers do not need information about the links on which the MLD is operating. Within the MLD, there may be one or more client devices where each client device may be a MAC-PHY instance operating on a link. To make the operation efficient, authentication may be performed by the MLDs so that the client devices do not need to establish connections separately on each link, and the MLDs can perform a single setup for multiple links.

A collection of frames 214, which may be sent on the downlink (DL), can just as well be sent fully on 'Link 1,' fully on 'Link 2,' or partially on 'Link 1' and partially on 'Link 2'. This is because both the non-AP MLD 202 and AP MLD 216 share the same buffer for the BA agreement for both the links. The BA agreement may specify the capability of the sender and receiver and the policy for sending messages. In other words, the common buffer for BA agreement allows frames 214 to be sent on either or both Links 1 and 2.

For the AP MLD 202, in addition to radio addresses R1 and R2, address R3 is defined which identifies the AP MLD entity. A similar address is defined for the non-AP MLD, which in this case is client device S3. The MLDs may be any device that has the capability to use the 802.11be standard, such as a laptop computer, a desktop PC, PDA access point or Wi-Fi phone. The MLD may be fixed, mobile, or portable. The MLD may be a transmitter or receiver, and the MLD may include a media access control (MAC) and physical layer (PHY) interface to the wireless medium (WM).

Since the non-AP MLD 216 can send/receive frames over multiple links to/from an AP simultaneously, the throughput of the non-AP MLD 216 is higher than if were there only one link available. Also, since the non-AP MLD 216 can communicate using both Link 1 and Link 2 independently, the average channel access delay is reduced, thus improving latency.

There may exist a single association and a security context between a non-AP 216 MLD and AP MLD 202. Consequently, a single encryption key may be derived by both the MLDs to be used for encrypting/decrypting frames for both Links 1 and 2. Along with the common BA buffer

208 or 222, this allows the flexibility required to send frames over any link without much processing or queueing delay.

Figure 3:
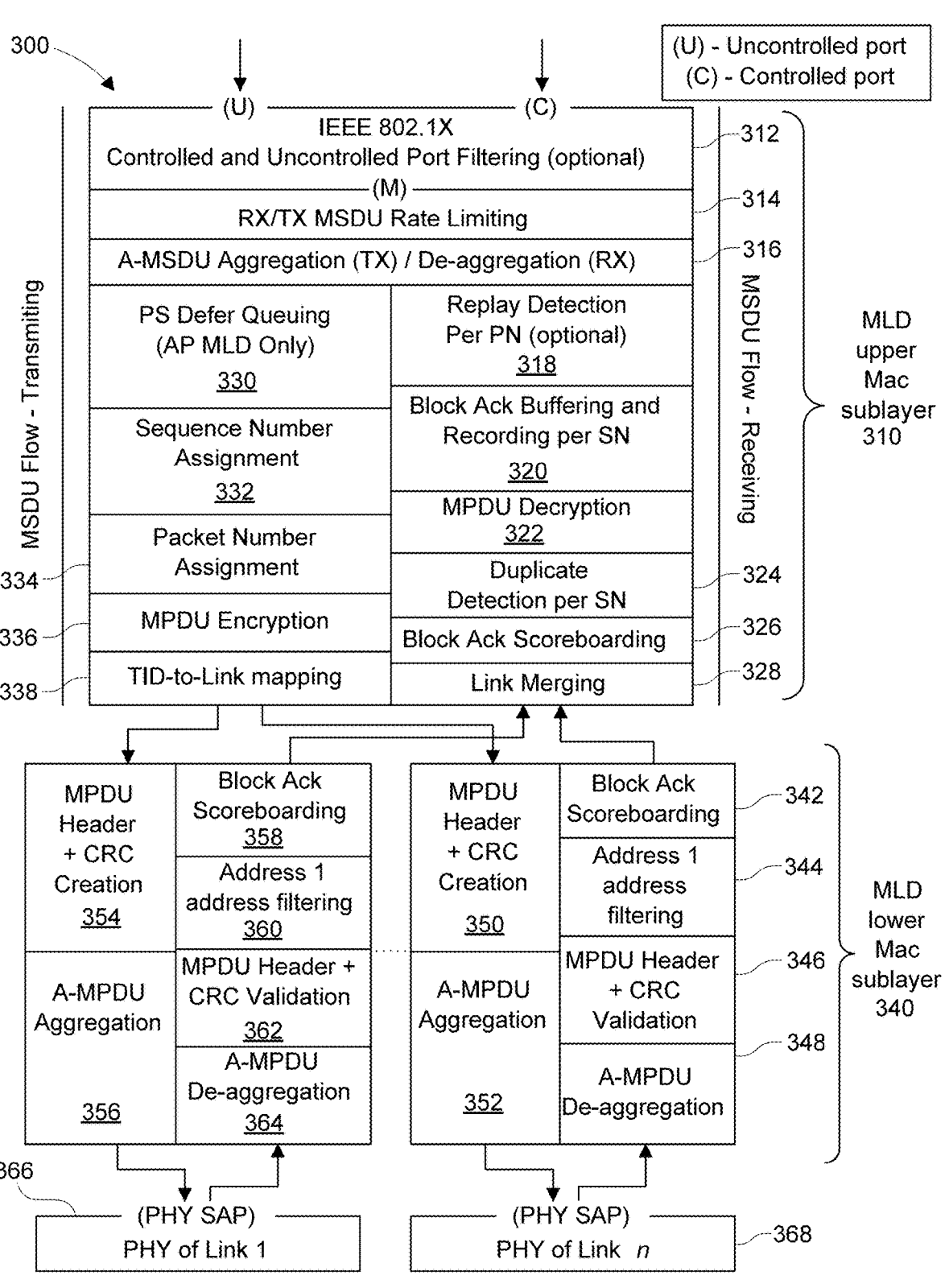
FIG. 3 shows an example MAC data plane architecture (MLO) for unicast data frames.

As noted above, in IEEE 802.11be, the MLD architecture includes MLD Upper MAC sublayer (MLD UMAC) and MLD lower MAC sublayer (MLD LMAC), UMAC and LMAC deal with different Wi-Fi packets routines. FIG. 3 shows a MAC data plane architecture (MLO) 300 for unicast data frames. The architecture 300 may be for an upgrading AP or a neighbor AP (such as APs 106*a-c* of FIG. 1). The architecture shows a MLD Upper MAC sublayer (UMAC) 310, a MLD Lower MAC sublayer (LMAC) 340, a physical layer (PHY) of a first link (Link 1) 366, and a physical layer (PHY) of an nth link (Link n) 368.

The MLD UMAC sublayer 310 according to one example includes the following common functions: IEEE 802.1X controlled and uncontrolled port filtering 312, RX/TX MSDU (Receive/Transmit MAC Service Data Unit) rate limiting 314, A-MSDU (Aggregate MAC Service Data Unit) aggregation (TX)/de-aggregation (RX) 316, replay detection per PN (Packet Number) 318, block acknowledgement (ack) buffering and re-ordering per SN (Sequence Number) 320, MPDU (Media Access Control Protocol Data Unit) decryption 322, duplicate detection per SN 324, block ack score boarding 326, link merging 328, PS defer queuing (AP MLD only) 330, sequence number assignment 332, packet number assignment 334, MPDU encryption 336, and TD-to-Link mapping 338. Uncontrolled (U) and Controlled (C) ports are designated in the figure. It is noted that a media access control protocol data unit (MAC PDU or MPDU) is a message that is exchanged between MAC entities in a communication system based on the layered OSI model.

Each MLD LMAC sublayer 340 of physical layers (PHY) of Link 1 (366) to Link n (368) according to the example includes the following per-link functions running inside the physical link: block ack score boarding 342, 358, address 1 address filtering 344, 360, MPDU header+CRC (Cyclic Redundancy Check) validation 346, 362, A-MPDU de-aggregation 348, 364, MPDU header+CRC creation 350, 354, and A-MPDU aggregation 352, 356.

MLD UMAC 310 includes the below significant routines:
1. AMSDU (Aggregate MSDU) aggregation/de-aggregation 316
2. BA (Block Acknowledgement) score boarding 320
3. Encryption 336/decryption 322
4. PN (Packet Number) assignment 334, replay detection 318
5. SEQ assignment 332, duplicate detection 324

MLD LMAC 340 includes the below significant routines:
1. AMPDU (Aggregate MPDU) aggregation 352, 356/de-aggregation 348, 364
2. BA (Block Ack) score boarding 342

In some AP platforms, two significant forwarding modes are supported: tunnel mode (e.g., raw tunnel mode or d-tunnel mode) and non-tunnel mode (e.g., bridge mode). MLO operates in a different way for these two modes. For tunnel mode, the MLD UMAC sublayer 310 is resident in a controller (such as controller 104 of FIG. 1) and the MLD LMAC sublayer 340 runs in an AP (such as APs 106*a-c* of FIG. 1). For non-tunnel mode, both the MLD UMAC sublayer 310 and the MLD LMAC sublayer 340 run in an AP.

In examples of the present disclosure, during the upgrading, contents of the MLD Upper MAC sublayer 310 are moved to a location external to the upgrading AP (e.g., 106*a-c* of FIG. 1), for example to a controller, a central cloud platform, a virtual controller (which may be another AP), a gateway, or others. A tunnel is created between the external location and the AP 106*a-c*, and all AP frames 802.11 are transmitted to the external location. During the upgrading the MLD Lower MAC sublayer 340 is left in a physical AP 106*a-c* (in some examples being temporarily moved to a neighbor AP), so that clients have the flexibility to roam from one AP to another seamlessly.

MAC Address/BSSID Allocation and Assignment

In traditional WLAN networks, MAC address/BSSID are pre-allocated and stored in the AP's flash memory in the factory. At run time, once the AP obtains a configuration from either a controller or a management module to create a Virtual Access Point (VAP), the MAC address/BSSID of the VAP is derived from the pre-allocated MAC address. All of the MAC addresses can only be used in this single AP.

In contrast, in the present disclosure, MAC address/ BSSID could be (a) derived from a pre-stored MAC address pool in a flash memory or (b) transferred from a neighbor AP which plans to do a live-upgrade.

FIG. 4 is an example computing component 400 that may be used to implement various features of upgrading an Access Point (AP) having Multi-Link Operation (MLO) according to an example of the present disclosure. The upgrading AP may be an AP such as, for example, APs 106*a-c* of FIG. 1. The upgrading AP 106*a-c* has a Multi-Link Device (MLD) comprising a UMAC sublayer (MLD UMAC, such as MLD UMAC 310 of FIG. 3) and an LMAC sublayer (MLD LMAC, such as MLD LMAC 340 of FIG. 3. The MLD LMAC 340 is in a physical AP.

Computing component 400 may be, for example, a server computer, a controller, or any other similar computing component capable of processing data. Computing component 400 may be resident on the upgrading AP or may be a server computer, controller, or other similar computing component external to but in communication with the upgrading AP. In the example implementation of FIG. 4, the computing component 400 includes a hardware processor 402 and machine-readable storage medium for 404.

Hardware processor 402 may be one or more central processing units (CPUs), semiconductor-based micropro- cessors, and/or other hardware devices suitable for retrieval and execution of instructions stored in machine-readable storage medium 404. Hardware processor 402 may fetch, decode, and execute instructions, such as instructions 406- 424, to control processes or operations for implementing the various features of FIG. 4. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine- readable storage medium 404, may be any electronic, mag- netic, optical, or other physical storage device that contains or stores executable instructions. Thus, machine-readable storage medium 404 may be, for example, Random Access Memory (RAM), non-volatile RAM (NVRAM), an Electri- cally Erasable Programmable Read-Only Memory (EE- PROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-424.

Hardware processor 402 may execute instruction 406 to determine whether the MLD of the upgrading AP is in a tunnel mode. Once an AP is selected to perform a live upgrading (such AP hereinafter being referred to as an "upgrading AP"), if the MLD is not in tunnel mode then the MLD is switched to tunnel mode temporarily for this MLD.

Hardware processor 402 may execute instruction 408 to, when the MLD is not in the tunnel mode, switch the MLD to the tunnel mode. This includes creating a tunnel between the upgrading AP (such as, for example, APs 106*a-c* of FIG. 1) and a location external to the upgrading AP (such as controller 104 of FIG. 1). In some examples the location external to the upgrading AP (also referred to as the external location) may be a controller, a central cloud platform, a virtual controller, another AP, a gateway, or others. This is a pre-upgrading step. As noted above, the word "tunnel" refers to an encapsulated mode of transporting data between an AP (such as the upgrading AP) and a controller (such as con- troller 104).

Hardware processor 402 may execute instruction 410 to transfer the contents of the MLD UMAC 310 to a controller (such as controller 104) or another external location. Instruc- tion 410 can effect the switch to tunnel mode temporarily without disrupting the client connection. While the opera- tions of instruction 410 are occurring, the upgrading AP can hold all received packets in the MLD LMAC sublayer.

Figure 5:
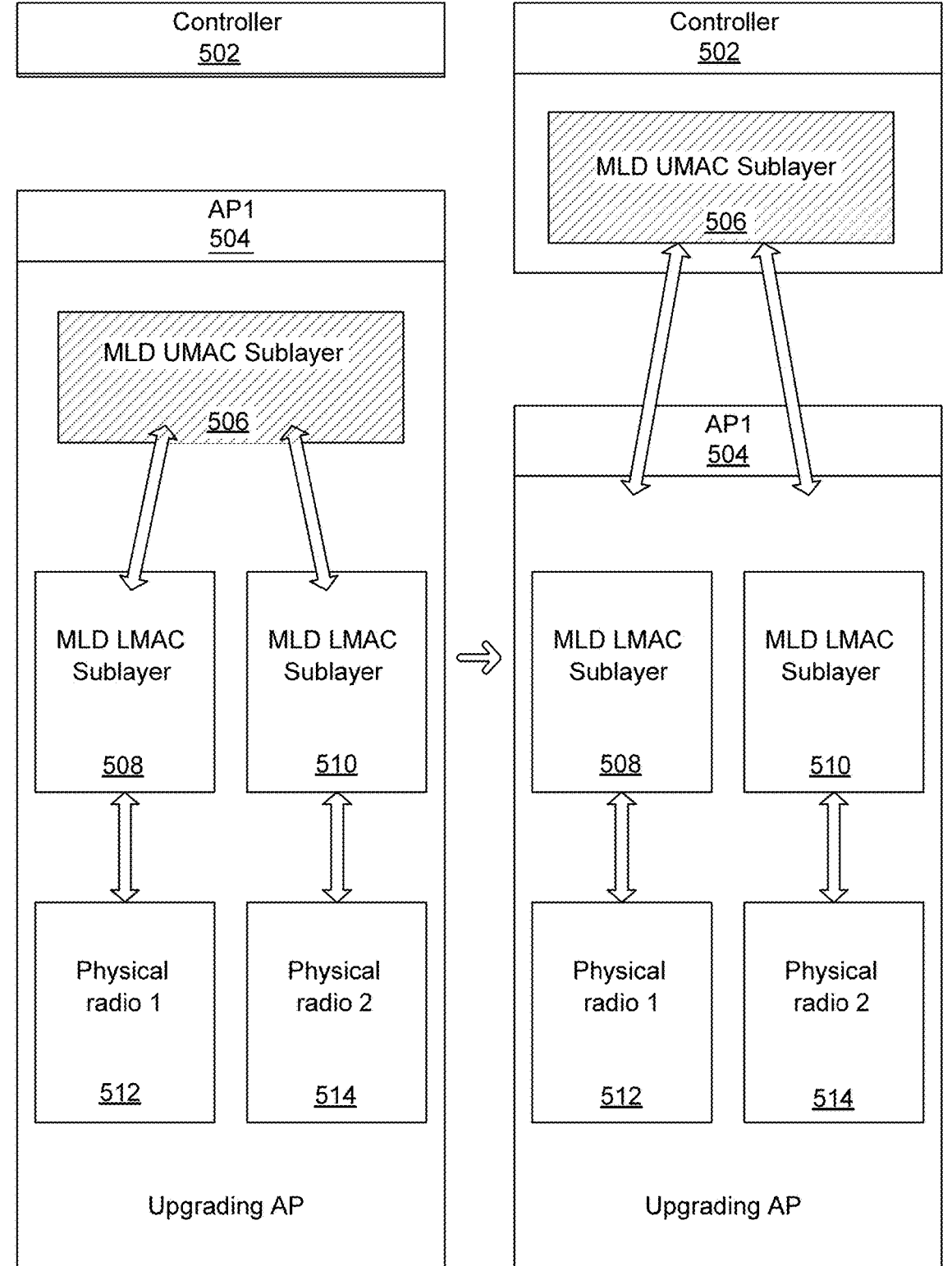
FIG. 5 illustrates an upgrading AP transferring the contents of an MLD UMAC sublayer to a controller according to an example of the present disclosure.

Referring to FIG. 5 momentarily for further explanation of instruction 410, FIG. 5 illustrates an upgrading AP 504 performing the operations of instruction 410 according to one example. FIG. 5 shows an upgrading AP 504 with MLD UMAC sublayer 506 and MLD LMAC sublayers 508, 510. The MLD LMAC sublayers 508, 510 communicate with physical radios 512 and 514, respectively. The operations of instruction 410 include syncing and copying all contents of the MLD UMAC 506 from the upgrading AP 504 to the controller 502 (or in other examples to another external location). This is illustrated in FIG. 5, in which the shading of the MLD UMAC 506 is provided to highlight the change in location of the MLD UMAC 506 from the upgrading AP 504 to the controller 502. Accordingly, FIG. 5 shows an example of AP 504 during upgrade, in which the MLD UMAC 506 is moved to the controller 502.

It is noted that while the example of FIG. 5 shows that the MLD UMAC 506 is transferred from the upgrading AP 504 to the controller 502, the present disclosure is not limited to this example, and contents of the MLD UMAC 506 may be synced and copied to another location that is external to the upgrading AP 504, such as a central cloud platform, a virtual controller, or others. In any event a tunnel is created between the external location and the upgrading AP 504, and all AP frames 802.11 are transmitted to the external location.

Once the sync/copy is done, the controller 502 runs the MLD UMAC 506 temporally for the upgrading AP 504. The MLD LMAC sublayers 508, 510 of the upgrading AP 504 are reconnected to the temporal MLD UMAC 506 of the controller 502. Traffic is resumed at the upgraded AP 504 using the temporal MLD UMAC 506 of the controller 502. A re-key may be needed to resume the traffic.

Accordingly, in the example of FIG. 5, during the upgrad- ing the MLD LMAC sublayers 508, 510 are left in the physical AP 504. In other examples the MLD LMAC sublayer 508, 510 could be temporarily moved to a neighbor AP. In any event, clients can have the flexibility to roam from one AP to another seamlessly.

Referring again to FIG. 4, hardware processor 402 may execute instruction 412 to transfer contents of an MLD LMAC comprising one or more MLD links, to one or more neighbor APs (such as APs 106a-c of FIG. 1). This is a pre-upgrading operation. Once the MLD UMAC sublayer is running in the controller or an external location, the contents of one or more MLD LMAC links can be transferred to a selected neighbor AP. The instruction 412 to transfer a MLD LMAC link without disrupting the client connection according to one example includes (1) syncing and copying all contents of an MLD LMAC to the one or more neighbor APs to create an emulated MLD LMAC at the one or more neighbor APs, (2) connecting, by the one or more neighbor APs, the emulated MLD LMAC to the MLD UMAC of the controller, (3) resuming traffic at the controller and the one or more neighbor APs, and (4) deleting the MLD LMAC from the upgrading AP. Only one MLD link may be transferred at a time.

The upgrading AP discards all received packets from the transferring MLD LMAC sublayer. The selected neighbor AP could choose to increase TX power to improve the coverage. The MLD LMAC sublayer for different physical links could be transferred to different neighbor APs. Factors that may impact the process of selecting a neighbor AP include the order of AP live upgrading, the coverage of neighbor APs, the user load on neighbor APs, the RF capability of neighbor APs, etc.

In some cases, if there are not many neighbor APs in the same channel as the upgrading AP, the controller could choose to change the upgrading AP's channel to include more candidate neighbor APs in the same channel, or change the neighbor AP's channel to the upgrading AP's channel.

Figure 6:
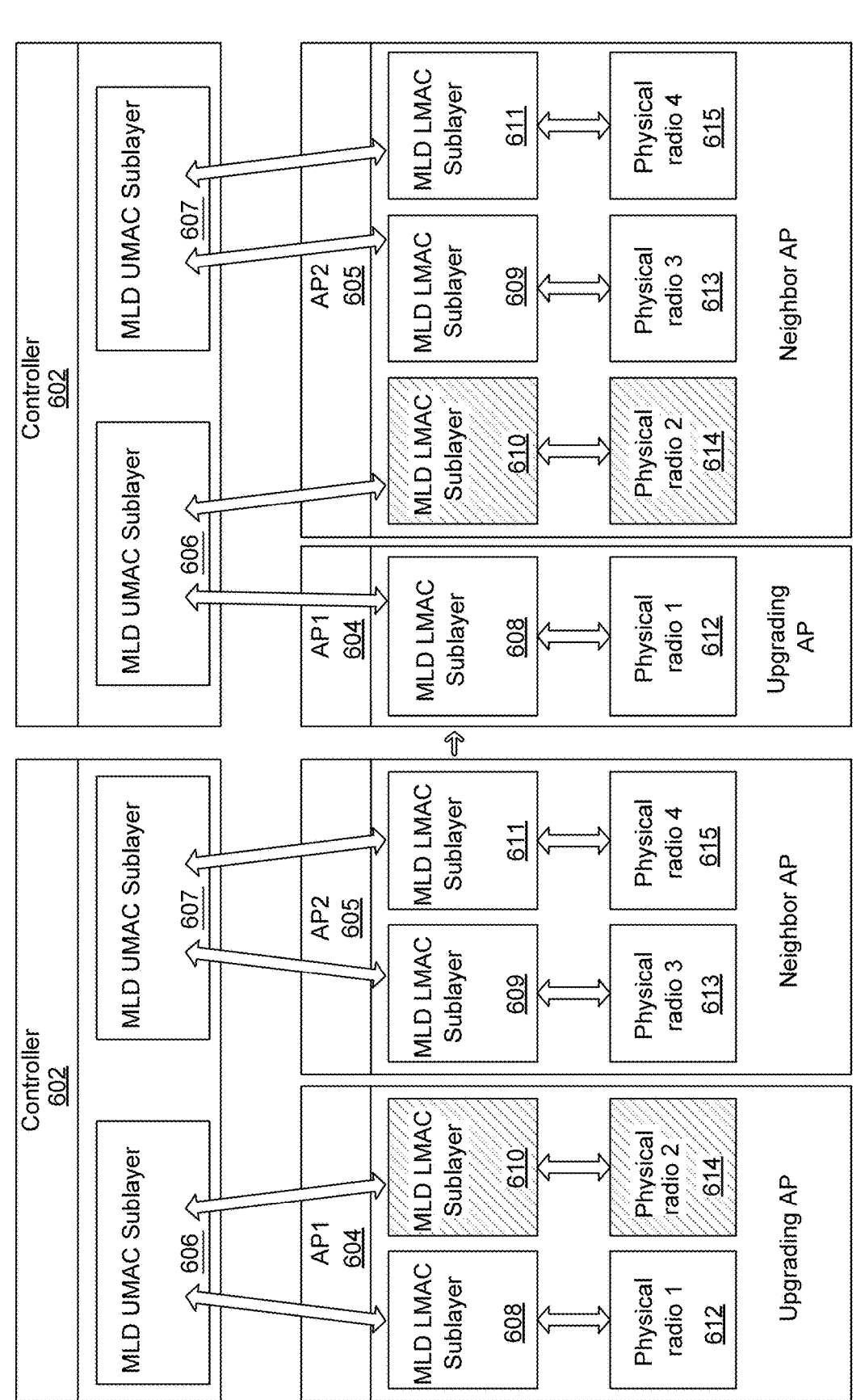
FIG. 6 illustrates transfer of an MLD LMAC sublayer to a single neighbor AP according to an example of the present disclosure.

FIG. 6 illustrates one MLD LMAC sublayer transfer to a single neighbor AP according to an example. FIG. 6 shows an upgrading AP 604 and a neighbor AP 605. The upgrading AP 604 has MLD LMAC sublayers 608, 610 communicating with physical radios 612, 614 respectively. The neighbor AP 605 has MLD LMAC sublayers 609, 611 communicating with physical radios 614, 616 respectively. The MLD UMAC sublayer 606 of the upgrading AP 604 has been moved to controller 602. The MLD UMAC sublayer 607 of the neighbor AP 605 has also been moved to the controller 602. In the example of FIG. 6, during upgrade only one MLD LMAC sublayer 610 is transferred to a single neighbor AP, i.e., to neighbor AP 605. This is illustrated in FIG. 6, in which the shading of the MLD LMAC 610 is provided to highlight the change in location of the MLD LMAC 610 from the upgrading AP 604 to the neighbor AP 605.

Accordingly, in one example, instruction 412 of FIG. 4 can effect transfer of contents of an MLD LMAC comprising one or more MLD links, to a single neighbor AP 605. This is a pre-upgrading operation. Once the MLD UMAC sublayer 606 of the upgrading AP 604 is running in the controller 602 (or an external location in another example), the contents of one or more MLD LMAC links can be transferred to selected neighbor AP 605. In the example of FIG. 6 the instruction 412 to transfer a MLD LMAC link without disrupting the client connection includes (1) syncing and copying all contents of the MLD LMAC 610 to the single AP 605 to create an emulated MLD LMAC at the single neighbor AP 605, (2) connecting, by the single neighbor AP 605, the emulated MLD LMAC to the MLD UMAC 606 of the controller 602 (or external location), (3) resuming traffic at the controller 602 (or external location) and the single neighbor AP 605, and (4) deleting the MLD LMAC 610 from the upgrading AP 604. Only one MLD link may be transferred at a time. The upgrading AP 604 discards all received packets from the transferring MLD LMAC sublayer 610. The selected neighbor AP 605 could choose to increase TX power to improve the coverage.

Figure 7:
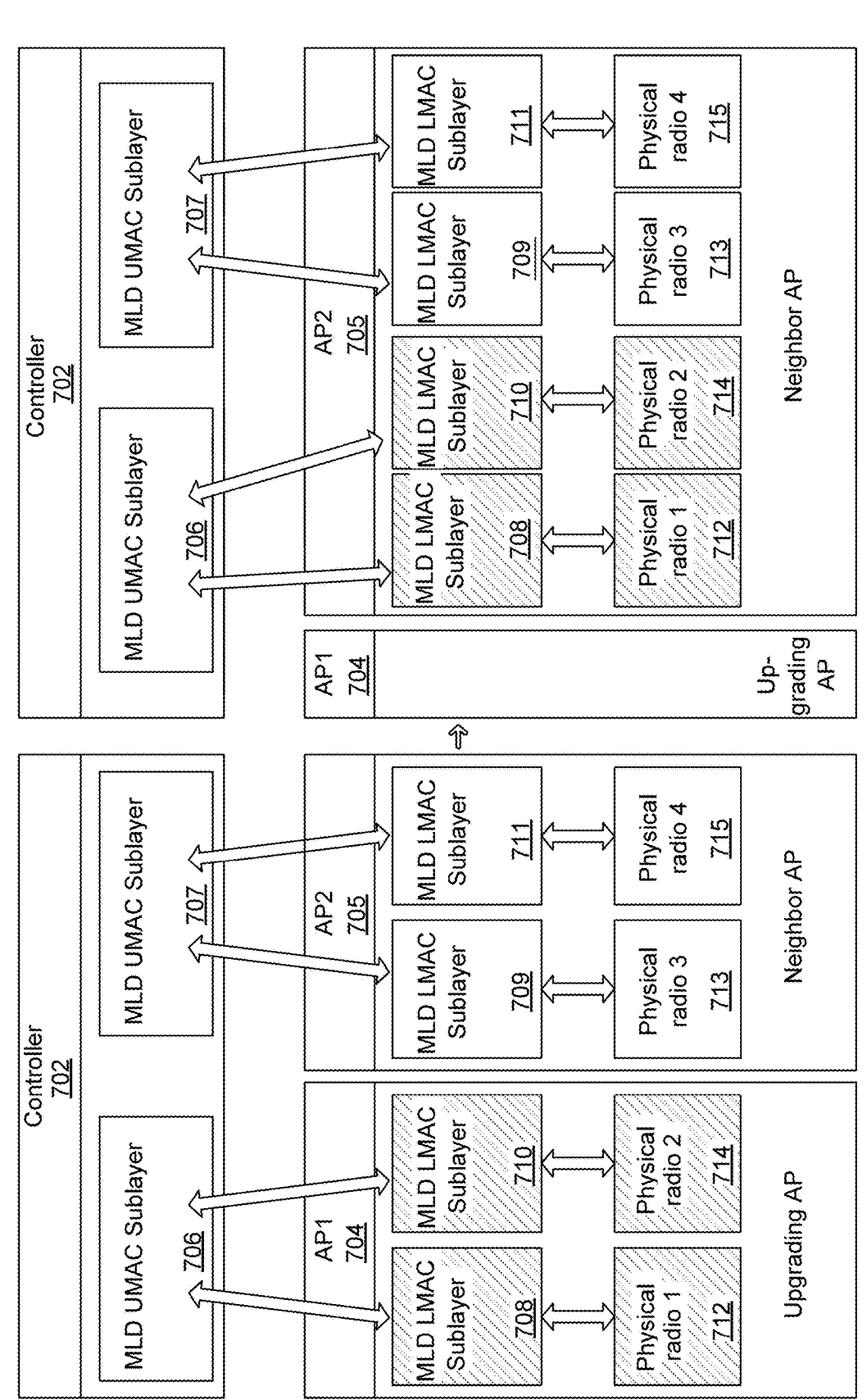
FIG. 7 illustrates transfer of two MLD LMAC sublayers to a single neighbor AP according to an example of the present disclosure.

FIG. 7 illustrates transfer of two MLD LMAC sublayers to a neighbor AP according to another example. FIG. 7 shows an upgrading AP 704 and a neighbor AP 705. The upgrading AP 704 has MLD LMAC sublayers 708, 710 communicating with physical radios 712, 714 respectively. The neighbor AP 705 has MLD LMAC sublayers 709, 711 communicating with physical radios 713, 715 respectively. The MLD UMAC sublayer 706 of the upgrading AP 704 has been moved to controller 702. The MLD UMAC sublayer 707 of the neighbor AP 705 has also been moved to the controller 702. In the example of FIG. 7 both MLD LMAC sublayers 708, 710 are transferred to a single neighbor AP, i.e., neighbor AP 705. This is illustrated in FIG. 7, in which the shading of the MLD LMAC sublayers 708, 710 is provided to highlight the change in location of the MLD LMAC sublayers 708, 710 from the upgrading AP 704 to the neighbor AP 705.

Figure 8:
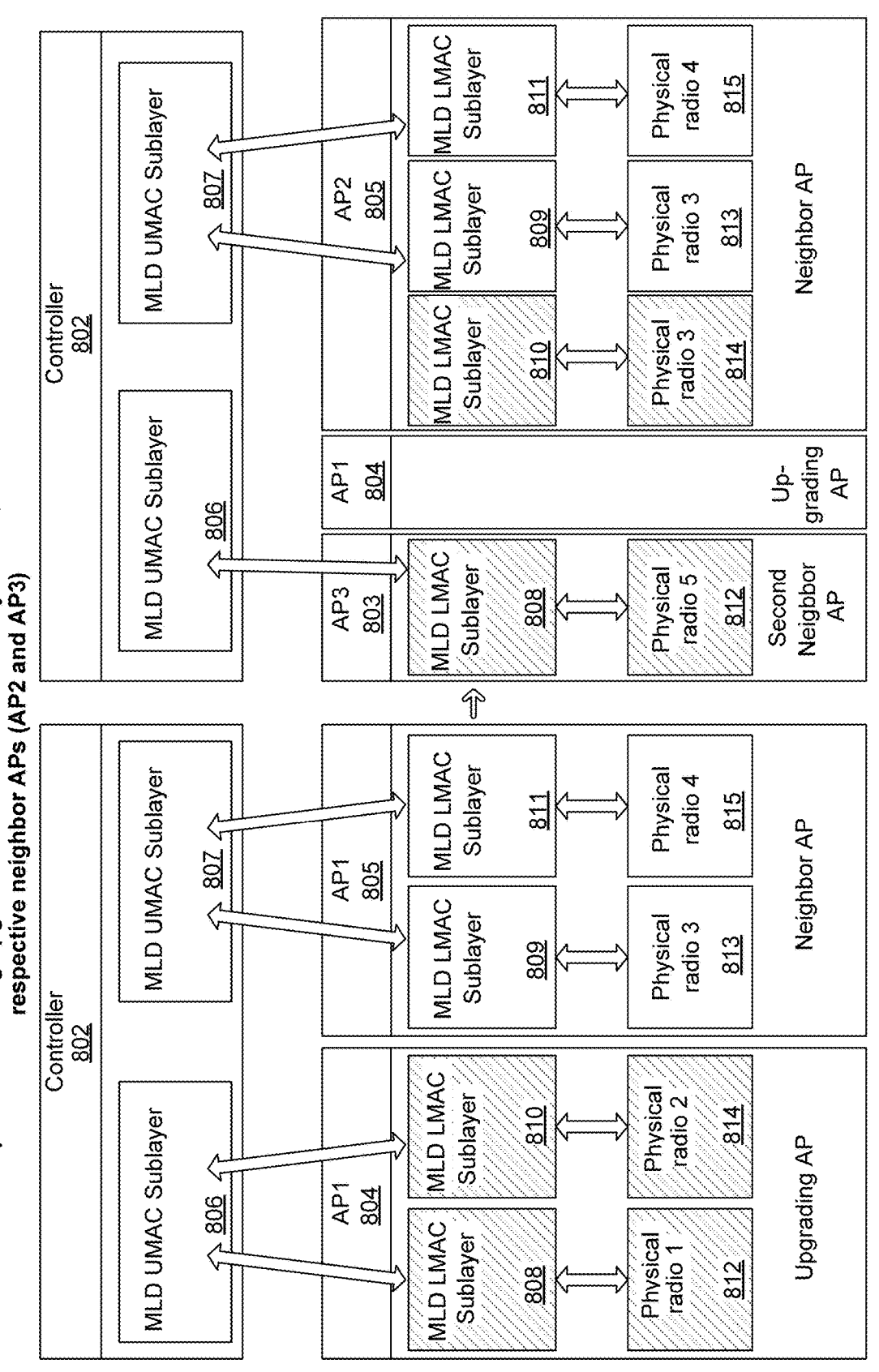
FIG. 8 illustrates transfer of two MLD LMAC sublayers to different neighbor APs according to another example of the present disclosure.

Accordingly, in another example, instruction 412 of FIG. 4 can effect transfer of contents of two MLD LMACs 708, 710 each comprising one or more MLD links, to a single neighbor AP 705. This is a pre-upgrading operation. Once the MLD UMAC sublayer 706 of the upgrading AP 704 is running in the controller 702 (or an external location), the contents of one or more MLD LMAC links of each MLD LMAC sublayer 708, 710 can be transferred to a selected neighbor AP 705. The instruction 412 to transfer a MLD LMAC link without disrupting the client connection according to one example includes (1) syncing and copying all contents of an MLD LMAC 708, 710 to the single neighbor AP 705 to create emulated MLD LMACs 708, 710 at the single neighbor AP 705, (2) connecting, by the single neighbor AP 705, the emulated MLD LMACs 708, 710 to the MLD UMAC 706 of the controller 702, (3) resuming traffic at the controller 702 and the single neighbor AP 705, and (4) deleting the MLD LMACs 708, 710 from the upgrading AP 704. Only one MLD link may be transferred at a time. The upgrading AP 704 discards all received packets from the transferring MLD LMAC sublayers 708, 710. The selected neighbor AP 705 could choose to increase TX power to improve the coverage. FIG. 8 illustrates transfer of two MLD LMAC sublayers to different neighbor APs according to another example. FIG. 8 shows an upgrading AP 804, a first neighbor AP 805, and a second neighbor AP 803. The upgrading AP 804 has MLD LMAC sublayers 808, 810 communicating with physical radios 812, 814 respectively. The first neighbor AP 805 has MLD LMAC sublayers 809, 811 communicating with physical radios 813, 815 respectively. The MLD UMAC sublayer 806 of the upgrading AP 804 has been moved to controller 802. The MLD UMAC sublayer 807 of the neighbor AP 805 has also been moved to the controller 802. In the example of FIG. 8 the MLD LMAC sublayers 808, 810 are transferred to respective different neighbor APs 803, 805. This is illustrated in FIG. 8, in which the shading of the MLD LMAC sublayers 808, 810 is provided to highlight the change in location of the MLD LMAC sublayers 808, 810 from the upgrading AP 804 to the respective neighbor APs 803, 805.

Accordingly, in another example, instruction 412 of FIG. 4 can effect transfer of contents of MLD LMACs 808, 810 comprising one or more MLD links, to respective neighbor APs 803, 805. This is a pre-upgrading operation. Once the MLD UMAC sublayer 806 is running in the controller 802 (or in another example in an an external location), the contents of the MLD LMAC links of MLD LMAC sublayers 808, 810 can be transferred to respective neighbor APs 803, 805. The instruction 412 to transfer a MLD LMAC link without disrupting the client connection according to one example includes (1) syncing and copying all contents of MLD LMACs 808, 810 to the respective neighbor APs 803, 805 to create emulated MLD LMACs 808, 810 at the respective neighbor APs 803, 805, (2) connecting, by the respective neighbor APs 803, 805, the emulated MLD LMACs 808, 810 to the MLD UMAC 806 of the controller 802, (3) resuming traffic at the controller 802 and the respective neighbor APs 803, 805, and (4) deleting the MLD LMACs 808, 810 from the upgrading AP 804. Only one MLD link may be transferred at a time. The upgrading AP 804 discards all received packets from the transferring MLD LMACs 808, 810. The selected neighbor APs 803, 805 could choose to increase TX power to improve the coverage.

Accordingly, FIGS. 6-8 provide some examples of transferring MLD LMAC sublayer(s) of the upgrading AP to one or more neighbor APs. Specific implementations of transferring MLD LMAC sublayer(s) to neighbor AP(s) depends on delay and resources of the neighbor AP(s).

Referring again to FIG. 4, hardware processor 402 may execute instruction 414 to perform a live upgrade of the upgrading AP. Instruction 414 may be initiated when at least one MLD link of the contents of the MLD LMAC has been transferred to the one or more neighbor APs.

Hardware processor 402 may execute instruction 416 to reboot the upgrading (now upgraded) AP after the live upgrade is completed.

Hardware processor 402 may execute instruction 418 to transfer the MLD links previously transferred to the one or more neighbor APs back to the upgraded AP. This is a post-upgrading instruction to transfer the MLD LMAC sublayer(s) back to the upgraded AP without disrupting the client connection.

This instruction 418 of transferring the MLD links previously transferred to the one or more neighbor APs back to the upgraded AP includes (1) syncing and copying all contents of the MLD LMAC transferred from the upgrading AP to the one or more neighbor APs, back to the upgraded AP, (2) connecting, at the upgraded AP, the contents of the MLD LMAC transferred back from the one or more neighbor APs to the MLD UMAC of the controller, (3) deleting, at the one or more neighbor APs, the contents of the MLD LMAC transferred from the upgrading AP, and (4) resuming traffic at the upgraded AP using the MLD UMAC of the controller. Only one MLD LMAC may be transferred at a time. The neighbor AP can discard all received packets from the transferring MLD LMAC sublayer(s).

As one example, as noted above FIG. 6 illustrates one MLD LMAC sublayer transfer to a single neighbor AP. In this example, the instruction 418 of FIG. 4 of transferring the MLD links previously transferred to the single neighbor AP 605 back to the upgraded AP 604 includes (1) syncing and copying all contents of the MLD LMAC 610 transferred from the upgrading AP 604 to the single neighbor AP 605, back to the upgraded AP 604, (2) connecting, at the upgraded AP 604, the contents of the MLD LMAC 610 transferred back from the single neighbor AP 605 to the MLD UMAC 606 of the controller 602, (3) deleting, at the single neighbor AP 605, the contents of the MLD LMAC 610 transferred from the upgrading AP 604, and (4) resuming traffic at the upgraded AP 604 using the MLD UMAC 606 of the controller 602 (or external location in another example). Only one MLD LMAC 610 may be transferred at a time. The neighbor AP 605 can discard all received packets from the transferring MLD LMAC sublayer(s) 610.

As another example, as noted above, in FIG. 7 two MLD LMAC sublayers 708, 710 are transferred to a single neighbor AP, i.e., neighbor AP 705. In this example, the instruction 418 of FIG. 4 of transferring the MLD links previously transferred to the neighbor AP 705 back to the upgraded AP 704 includes (1) syncing and copying all contents of the MLD LMACs 708, 710 transferred from the upgrading AP 704 to the neighbor AP 705, back to the upgraded AP 704, (2) connecting, at the upgraded AP 704, the contents of the MLD LMACs 708, 710 transferred back from the neighbor AP 705 to the MLD UMAC 706 of the controller 702, (3) deleting, at the neighbor AP 705, the contents of the MLD LMACs 708, 710 transferred from the upgrading AP 704, and (4) resuming traffic at the upgraded AP 704 using the MLD UMAC 706 of the controller 702. Only one MLD LMAC 708, 710 may be transferred at a time. The neighbor AP 705 can discard all received packets from the transferring MLD LMAC sublayers 708, 710.

As another example, as noted above, in FIG. 8 MLD LMAC sublayers 808, 810 are transferred to respective different neighbor APs 803, 805. In this example, the instruction 418 of transferring the MLD links previously transferred to the respective neighbor APs 803, 805 back to the upgraded AP 804 includes (1) syncing and copying all contents of the MLD LMACs 808, 810 transferred from the upgrading AP 804 to the respective neighbor APs 803, 805, back to the upgraded AP 804, (2) connecting, at the upgraded AP 804, the contents of the MLD LMACs 808, 810 transferred back from the respective neighbor APs 803, 805 to the MLD UMAC 806 of the controller 802, (3) deleting, at the respective neighbor APs 803, 805, the contents of the MLD LMACs 808, 810 transferred from the upgrading AP 804, and (4) resuming traffic at the upgraded AP 804 using the MLD UMAC 806 of the controller 802. Only one MLD LMAC 808, 810 may be transferred at a time. The respective neighbor APs 803, 805 can discard all received packets from the transferring MLD LMAC sublayers 808, 810.

Hardware processor 402 may execute instruction 420 to copy the contents of the MLD UMAC from the controller to the UMAC of the upgraded AP. This is a post-upgrading step to transfer the MLD UMAC sublayer back to the AP. This instruction 420 may include (1) syncing and copying all contents of the MLD UMAC from the controller to the upgraded AP, (2) running, at the upgraded AP, the MLD UMAC, (3) reconnecting the MLD LMAC sublayer(s), and (4) resuming traffic at the upgraded AP. Resuming the traffic may include implementing a re-key. The upgraded AP can hold all received packets in its MLD LMAC sublayer(s). This instruction can switch back from temporary tunnel mode to non-tunnel mode without disrupting the client connection.

As one example, as noted above FIG. 5 illustrates an upgrading AP 504 in which contents of the MLD UMAC 506 are moved to the controller 502. In this example, the instruction 420 of FIG. 4 can effect copy of the contents of the MLD UMAC 506 from the controller 502 to the MLD UMAC 506 of the upgraded AP 504. This is a post-upgrading step to transfer the MLD UMAC 506 back to the upgraded AP 504. This instruction 420 may include (1) syncing and copying all contents of the MLD UMAC 506 from the controller 502 to the upgraded AP 504, (2) running, at the upgraded AP 504, the MLD UMAC 506, (3) reconnecting the MLD LMAC sublayers 508, 510, and (4) resuming traffic at the upgraded AP 504. Resuming the traffic may include implementing a re-key. The upgraded AP 504 can hold all received packets in its MLD LMAC sublayers 508, 510. This instruction can switch back from temporary tunnel mode to non-tunnel mode without disrupting the client connection.

Hardware processor 402 may execute instruction 422 to, after the copying step, switch the upgraded AP from the tunnel mode to the non-tunnel mode. Hardware processor 402 may execute instruction 424 to, after the copying step, resume traffic at the upgraded AP.

Figure 9:
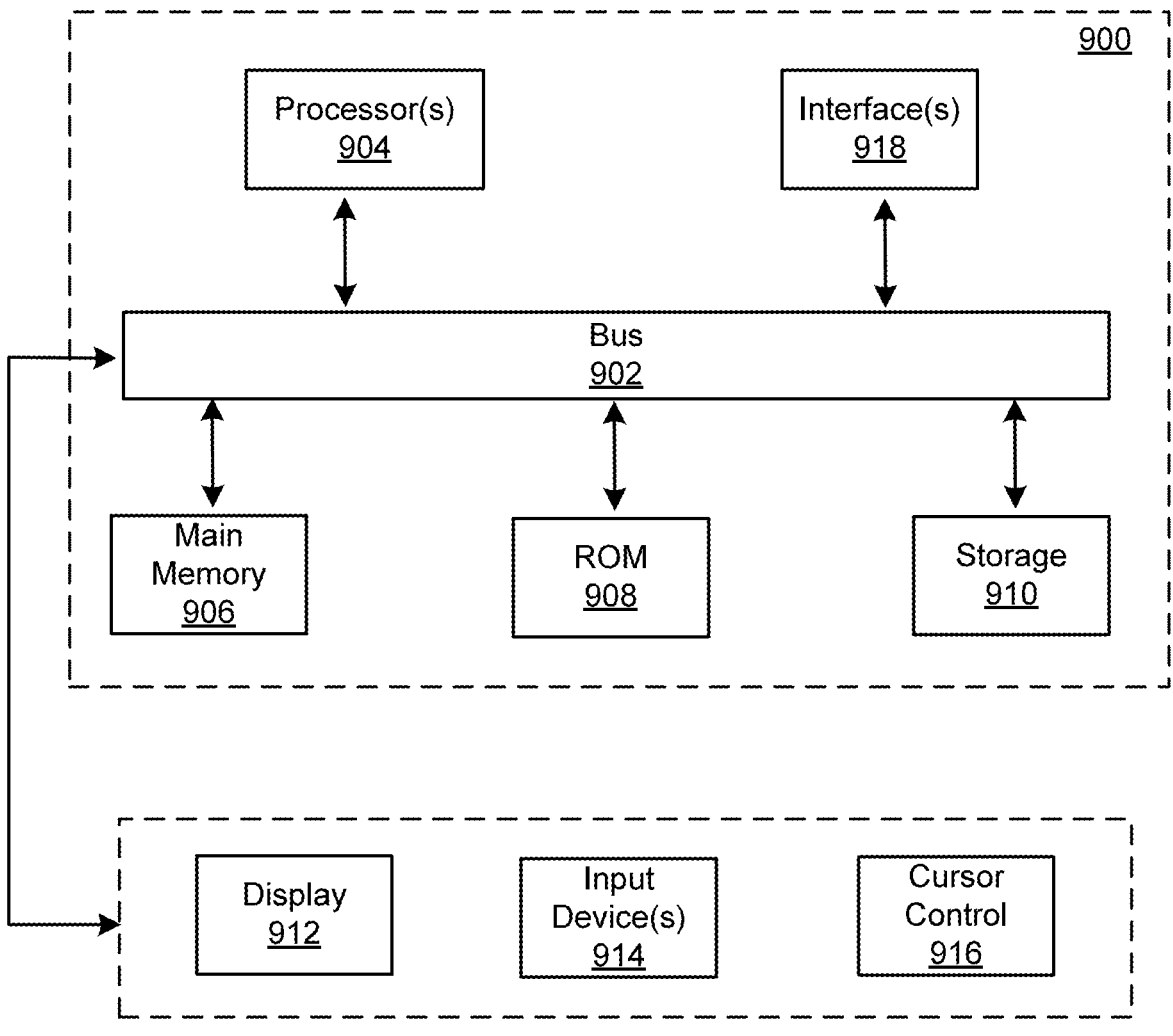
FIG. 9 depicts a block diagram of an example computer system in which various of the embodiments described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of upgrading an Access Point (AP) having Multi-Link Operation (MLO), the upgrading AP having a Multi-Link Device (MLD) comprising an Upper Media Access Control (UMAC) sublayer (MLD UMAC) and a Lower Media Access Control (LMAC) sublayer (MLD LMAC), the method comprising:

determining whether the MLD is in a tunnel mode;

when the MLD is not in the tunnel mode, switching the MLD to the tunnel mode;

transferring contents of the MLD UMAC to a location external to the upgrading AP using the tunnel;

transferring contents of the MLD LMAC, comprising one or more MLD links, to one or more neighbor APs; and performing a live upgrade of the upgrading AP.

2. The method of claim 1, further comprising:

rebooting the upgrading AP after the live upgrade is completed;

transferring the MLD links previously transferred to the one or more neighbor APs back to the upgraded AP; and copying the contents of the MLD UMAC from the external location to the UMAC of the upgraded AP.

3. The method of claim 2, further comprising, after the copying step, switching the upgraded AP from the tunnel mode to a non-tunnel mode.

4. The method of claim 1, wherein the external location is a controller, a central cloud platform, a virtual controller, another AP, a gateway, or others.

5. The method of claim 1, wherein the step of switching the MLD to the tunnel mode includes creating a tunnel between the external location and the upgrading AP.

6. The method of claim 1, wherein the step of transferring contents of the MLD UMAC to an external location comprises:

syncing and copying all contents of the MLD UMAC from the upgrading AP to the external location;

running, at the external location, the MLD UMAC temporally for the upgrading AP;

reconnecting the MLD LMAC of the upgrading AP to the temporal MLD UMAC of the external location; and resuming traffic at the upgraded AP using the temporal MLD UMAC of the external location.

7. The method of claim 1, wherein the step of transferring contents of the MLD LMAC, comprising one or more MLD links, to one or more neighbor APs comprises:

syncing and copying all contents of the MLD LMAC to the one or more neighbor APs to create an emulated MLD LMAC at the one or more neighbor APs;

connecting, by the one or more neighbor APs, the emulated MLD LMAC to the MLD UMAC of the external location;

resuming traffic at the external location and the one or more neighbor APs; and deleting the MLD LMAC from the upgrading AP.

8. The method of claim 1, further comprising:

when a number of neighbor APs in a same channel as the upgrading AP is below a predefined number, changing, by the external location, the channel of the upgrading AP to a new channel and searching for more candidate neighbor APs in the new channel.

9. The method of claim 1, further comprising:

when a number of neighbor APs in a same channel as the upgrading AP is below a predefined number, changing the channel of a candidate neighbor AP in a new channel to the same channel as the upgrading AP.

10. The method of claim 1, further comprising:

initiating the step of performing a live upgrade of the upgrading AP when at least one MLD link of the contents of the MLD LMAC has been transferred to the one or more neighbor APs.

11. The method of claim 2, wherein the step of transferring the MLD links previously transferred to the one or more neighbor APs back to the upgraded AP comprises:

syncing and copying all contents of the MLD LMAC, transferred from the upgrading AP to the one or more neighbor APs, back to the upgraded AP;

connecting, at the upgraded AP, the contents of the MLD LMAC transferred back from the one or more neighbor APs to the MLD UMAC of the external location;

deleting, at the one or more neighbor APs, the contents of the MLD LMAC transferred from the upgrading AP; and resuming traffic at the upgraded AP using the MLD UMAC of the external location.

12. The method of claim 2, wherein the step of copying the contents of the MLD UMAC from the external location to the UMAC of the upgraded AP comprises:

syncing and copying all contents of the MLD UMAC from the external location to the upgraded AP;

running, at the upgraded AP, the MLD UMAC;

reconnecting the MLD LMAC; and resuming traffic at the upgraded AP.

13. An Access Point (AP) having Multi-Link Operation (MLO), the AP having a Multi-Link Device (MLD) comprising an Upper Media Access Control (UMAC) sublayer (MLD UMAC) and a Lower Media Access Control (LMAC) sublayer (MLD LMAC), the AP comprising:

a memory; and one or more processors that are configured to execute machine-readable instructions stored in the memory to:

determine whether the MLD is in a tunnel mode that provides a tunnel between the MLD UMAC and a location external to the upgrading AP with communications that are compliant with IEEE 802.11, and when the MLD is not in the tunnel mode, switch the MLD to the tunnel mode;

transfer contents of the MLD UMAC including frames compliant with IEEE 802.11 to the external location;

transfer contents of the MLD LMAC, comprising one or more MLD links, to one or more neighbor APs; and perform a live upgrade of the AP.

14. The Access Point of claim 13, wherein the external location is a controller, a central cloud platform, a virtual controller, another AP, a gateway, or others.

15. The Access Point of claim 14, wherein the one or more processors are further configured to:

reboot the upgrading AP after the live upgrade is completed;

receive the MLD links previously transferred to the one or more neighbor APs back at the upgraded AP; and copy the contents of the MLD UMAC from the external location to the UMAC of the upgraded AP.

16. The Access Point of claim 14, wherein the instructions to transfer contents of the MLD UMAC to an external location comprise instructions to:

sync and copy all contents of the MLD UMAC from the upgrading AP to the external location;

run, at the external location, the MLD UMAC temporally for the upgrading AP;

reconnect the MLD LMAC of the upgrading AP to the temporal MLD UMAC of the external location; and resume traffic at the upgraded AP using the temporal MLD UMAC of the external location.

17. The Access Point of claim 14, wherein the instructions to transfer contents of the MLD LMAC, comprising one or more MLD links, to one or more neighbor APs comprise instructions to:

sync and copy all contents of the MLD LMAC to the one or more neighbor APs to create an emulated MLD LMAC at the one or more neighbor APs;

connect, by the one or more neighbor APs, the emulated MLD LMAC to the MLD UMAC of the external location;

resume traffic at the external location and the one or more neighbor APs; and delete the MLD LMAC from the upgrading AP.

18. The Access Point of claim 15, wherein instructions to receive the MLD links previously transferred to the one or more neighbor APs back at the upgraded AP comprise instructions to:

sync and copy all contents of the MLD LMAC, transferred from the upgrading AP to the one or more neighbor APs, back to the upgraded AP;

connect, at the upgraded AP, the contents of the MLD LMAC transferred back from the one or more neighbor APs to the MLD UMAC of the external location;

delete, at the one or more neighbor APs, the contents of the MLD LMAC transferred from the upgrading AP; and resume traffic at the upgraded AP using the MLD UMAC of the external location.

19. The Access Point of claim 15, wherein the instructions to copy the contents of the MLD UMAC from the external location to the UMAC of the upgraded AP comprise instructions to:

sync and copy all contents of the MLD UMAC from the external location to the upgraded AP;

run, at the upgraded AP, the MLD UMAC;

reconnect the MLD LMAC; and resume traffic at the upgraded AP.

20. A non-transitory machine-readable medium, storing instructions that, when executed, cause a processor to upgrade an Access Point (AP) having Multi-Link Operation (MLO), the AP having a Multi-Link Device (MLD) comprising an Upper Media Access Control (UMAC) sublayer (MLD UMAC) and a Lower Media Access Control (LMAC) sublayer (MLD LMAC), the instructions causing the processor to:

determine whether the MLD is in a tunnel mode, and when the MLD is not in the tunnel mode, switch the MLD to the tunnel mode;

transfer contents of the MLD UMAC to a location external to the upgrading AP using the tunnel;

transfer contents of the MLD LMAC, comprising one or more MLD links, to one or more neighbor APs;

perform a live upgrade of the AP;

reboot the upgrading AP after the live upgrade is completed;

transfer the MLD links previously transferred to the one or more neighbor APs back to the upgraded AP; and copy the contents of the MLD UMAC from the external location to the UMAC of the upgraded AP.

*    *    *    *    *